US011268621B2

(12) United States Patent
Kimpara et al.

(10) Patent No.: US 11,268,621 B2
(45) Date of Patent: Mar. 8, 2022

(54) HYDRAULIC CONTROL APPARATUS

(71) Applicants: Nidec Tosok Corporation, Zama (JP); Subaru Corporation, Tokyo (JP)

(72) Inventors: Kunio Kimpara, Zama (JP); Masayuki Nojo, Zama (JP); Mamoru Murakami, Tokyo (JP); Hiroaki Kosugi, Tokyo (JP)

(73) Assignees: NIDEC TOSOK CORPORATION, Kanagawa (JP); SUBARU CORPORATION, Tokyo (JP)

( * ) Notice: Subject to any disclaimer, the term of this patent is extended or adjusted under 35 U.S.C. 154(b) by 114 days.

(21) Appl. No.: 16/700,226

(22) Filed: Dec. 2, 2019

(65) Prior Publication Data
US 2020/0182363 A1    Jun. 11, 2020

(30) Foreign Application Priority Data

Dec. 5, 2018    (JP) .............................. JP2018-227982

(51) Int. Cl.
*F16K 17/04*    (2006.01)
*F16K 15/18*    (2006.01)
(Continued)

(52) U.S. Cl.
CPC ............ *F16K 15/1825* (2021.08); *F15B 1/26* (2013.01); *F16K 11/0712* (2013.01); *F01M 1/16* (2013.01);
(Continued)

(58) Field of Classification Search
CPC ............... F16K 17/044; F16K 17/0473; F16K 11/0712; F16K 15/185; G05D 16/0402;
(Continued)

(56) References Cited

U.S. PATENT DOCUMENTS 3,292,723 A  * 12/1966  Pinkerton ............... B62D 11/18
                                                    180/24.06
3,631,937 A  *  1/1972  Joyce ....................... B62D 5/32
                                                    180/406
(Continued)

FOREIGN PATENT DOCUMENTS

CN        106870724 A    6/2017
CN        207830626 U    9/2018
(Continued)

OTHER PUBLICATIONS

Official Communication issued in corresponding Chinese Patent Application No. 201911198186.5, dated Nov. 30, 2020.

*Primary Examiner* — Craig J Price
(74) *Attorney, Agent, or Firm* — Keating & Bennett (57) ABSTRACT

A hydraulic control apparatus includes an output-side oil passage into which oil from a first oil passage and oil from a second oil passage flow, and a pressure regulating check valve regulating a hydraulic pressure in the second oil passage. The pressure regulating check valve includes first and second elastic portions housed in a spool hole between a valve body and a bottom of the spool hole. A natural length of the second elastic portion is shorter than a distance between the valve body and the bottom when the valve body closes an inflow hole. The second elastic portion applies an elastic force to the valve body in a state in which the valve body opens the inflow hole.

11 Claims, 7 Drawing Sheets

(51) Int. Cl.
*F15B 1/26* (2006.01)
*F16K 11/07* (2006.01)
*F01M 1/16* (2006.01)

(52) U.S. Cl.
CPC ....... *F16K 17/044* (2013.01); *Y10T 137/7867* (2015.04); *Y10T 137/7925* (2015.04); *Y10T 137/86002* (2015.04); *Y10T 137/86019* (2015.04)

(58) Field of Classification Search
CPC .. G05D 16/0404; G05D 16/106; G05D 16/10; F16H 2061/0015; F16H 2061/0037; F16H 61/0021; F16H 61/0025; F16H 61/4017; F16H 61/4026; F16H 61/4043; F16H 61/4061; F15L 31/26; E02F 9/2278–2296; Y10T 137/7905; Y10T 137/7925; Y10T 137/86002; Y10T 137/86019; F01M 1/16
USPC .................................. 137/529; 251/366, 367
See application file for complete search history.

(56) References Cited

U.S. PATENT DOCUMENTS

| | | | | |
|---|---|---|---|---|
| 3,958,657 A * | 5/1976 | McBurnett | ............... | B62D 5/32 180/406 |
| 4,171,712 A * | 10/1979 | DeForrest | ............. | F16K 17/196 137/513.5 |
| 4,501,291 A * | 2/1985 | Siegrist | ................... | B29C 45/82 137/529 |
| 4,531,369 A * | 7/1985 | Izumi | ...................... | F16H 39/02 60/456 |
| 4,648,423 A * | 3/1987 | Henken | .................. | F16D 25/14 137/494 |
| 4,715,180 A * | 12/1987 | Rosman | .................... | B66F 9/22 60/372 |
| 4,852,608 A * | 8/1989 | Bennitt | ............... | F04B 39/1053 137/516.13 |
| 5,638,679 A * | 6/1997 | Richards | ................. | B63B 25/12 60/453 |
| 5,984,835 A * | 11/1999 | Kawa | ................... | F16H 61/067 477/150 |
| 7,296,594 B1 | 11/2007 | Phanco | | |
| 7,493,757 B2 * | 2/2009 | Kurz | ...................... | F15B 7/001 60/430 |
| 8,033,107 B2 * | 10/2011 | Tikkanen | ............... | F15B 7/006 60/464 |
| 8,038,416 B2 * | 10/2011 | Ono | ....................... | F04C 14/26 417/286 |
| 8,316,880 B2 * | 11/2012 | Grosskopf | ............ | F16K 17/044 137/504 |
| 8,763,634 B2 * | 7/2014 | Akaishi | ................... | F04B 49/08 137/516.27 |
| 8,801,396 B2 * | 8/2014 | Sundquist | ................ | F01M 1/16 417/310 |
| 8,997,473 B2 * | 4/2015 | Olson | ..................... | F15B 15/18 60/329 |
| 9,297,373 B2 * | 3/2016 | Bagagli | ................. | F16K 15/026 |
| 9,709,076 B2 * | 7/2017 | Akiyama | .............. | E02F 9/2217 |
| 9,784,267 B2 * | 10/2017 | Tsutsui | .................... | F04B 53/16 |
| 10,704,679 B2 * | 7/2020 | Murakami | .......... | F16H 57/0435 |
| 2001/0027811 A1 * | 10/2001 | Hirano | ..................... | F01M 1/16 137/538 |
| 2014/0116541 A1 * | 5/2014 | Jang | ........................ | F01M 1/16 137/538 |
| 2015/0075154 A1 | 3/2015 | Wi | | |
| 2017/0167599 A1 | 6/2017 | Hwang | | |
| 2017/0234176 A1 * | 8/2017 | Ward | ................... | F16K 31/1221 123/196 CP |
| 2018/0274670 A1 | 9/2018 | Murakami et al. | | |

FOREIGN PATENT DOCUMENTS

| | | |
|---|---|---|
| DE | 10 2013 014 286 A1 | 2/2015 |
| GB | 924505 A | 4/1963 |
| JP | 2015-057559 A | 3/2015 |
| JP | 2016-183579 A | 10/2016 |
| JP | 2018-115685 A | 7/2018 |
| JP | 2018-162821 A | 10/2018 |

* cited by examiner

HYDRAULIC CONTROL APPARATUS

CROSS REFERENCE TO RELATED APPLICATION

The present application claims priority under 35 U.S.C. § 119 to Japanese Application No. 2018-227982 filed on Dec. 5, 2018, the entire contents of which are hereby incorporated herein by reference.

1. FIELD OF THE INVENTION

The present disclosure relates to a hydraulic control apparatus.

2. BACKGROUND

Hydraulic pressure supply systems in which a full discharge mode and a half discharge mode are switched are known. A constitution in which the full discharge mode and the half discharge mode are switched, for instance, using a solenoid valve is disclosed in Japanese Unexamined Patent Application, First Publication No. 2015-057559.

In the hydraulic pressure supply systems as described above, because a flow rate of discharged oil is abruptly increased when the half discharge mode is switched to the full discharge mode, a supplied hydraulic pressure is abruptly changed. It is also conceivable that, for instance, an accumulator be provided to curb this abrupt change in hydraulic pressure, but there are problems therein such as the number of components of the hydraulic pressure supply system is increased and that the hydraulic pressure supply system is increased in size.

SUMMARY

Example embodiments of the present disclosure provide hydraulic control apparatuses each capable of limiting an abrupt change in hydraulic pressure supplied to a control target while limiting an increase in the number of components and an increase in size.

An example embodiment of a hydraulic control apparatus of the present disclosure is a hydraulic control apparatus that controls a control target using a hydraulic pressure. The hydraulic control apparatus includes an oil pump assembly including a first discharge port and a second discharge port, an input-side oil passage through which oil suctioned from an oil tank to the oil pump assembly passes, a first oil passage into which oil discharged from the first discharge port flows, a second oil passage into which oil discharged from the second discharge port flows, an output-side oil passage into which the oil from the first oil passage and the oil from the second oil passage flow and which supplies a hydraulic pressure to the control target, and a pressure regulating check valve provided on the second oil passage, checking a flow of the oil from the output-side oil passage to the second discharge port, and regulating a hydraulic pressure in the second oil passage. The pressure regulating check valve includes a housing including a spool hole that extends in a predetermined direction and includes a bottom on a first side thereof in the predetermined direction, an inflow hole that is located on a second side of the spool hole in the predetermined direction and is joined with an interior of the spool hole, and an outflow hole that is provided on an inner circumferential surface of the spool hole and is joined with the interior of the spool hole, a valve that is housed in the interior of the spool hole to be movable in the predetermined direction and includes a valve body that can open/close the inflow hole, a first elastic portion that is housed in the interior of the spool hole between the valve body and the bottom in the predetermined direction, extends in the predetermined direction, and applies an elastic force toward the other side in the predetermined direction to the valve body, and a second elastic portion that is housed in the interior of the spool hole between the valve body and the bottom in the predetermined direction and extends in the predetermined direction. A natural length of the second elastic portion in the predetermined direction is shorter than a natural length of the first elastic portion in the predetermined direction, and is shorter than a distance between the valve body and the bottom in the predetermined direction when the valve body closes the inflow hole. The second elastic portion applies an elastic force toward the second side in the predetermined direction to the valve body in a state in which the valve body has opened the inflow hole.

According to example embodiments of the present disclosure, hydraulic control apparatuses are able to limit an abrupt change in a hydraulic pressure supplied to a control target while limiting an increase in the number of components and an increase in size.

The above and other elements, features, steps, characteristics and advantages of the present disclosure will become more apparent from the following detailed description of the example embodiments with reference to the attached drawings.

DETAILED DESCRIPTION

First Example Embodiment

Figure 1:
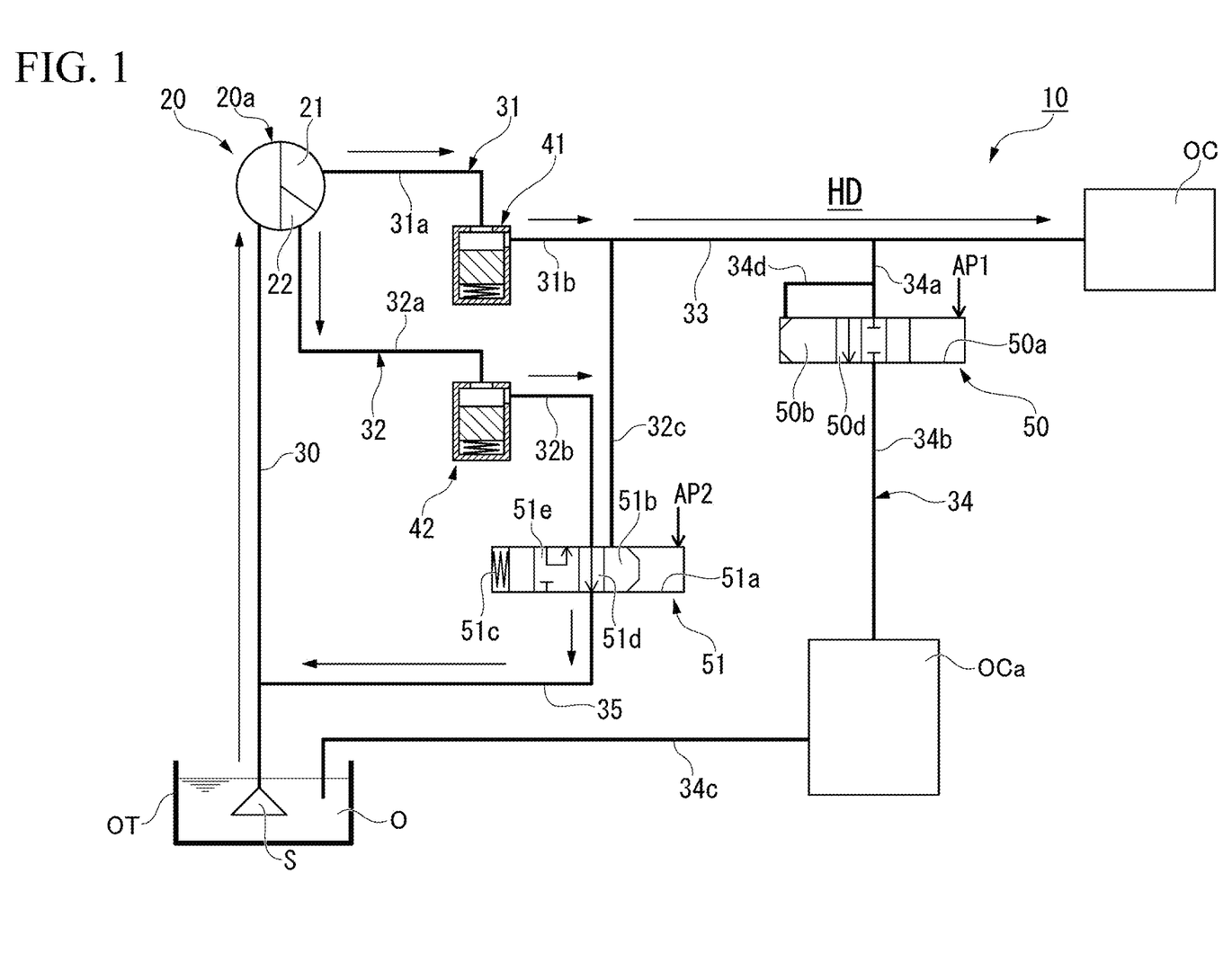
FIG. 1 is a diagram schematically showing one actuated state of a hydraulic control apparatus of a first example embodiment of the present disclosure.
Figure 2:
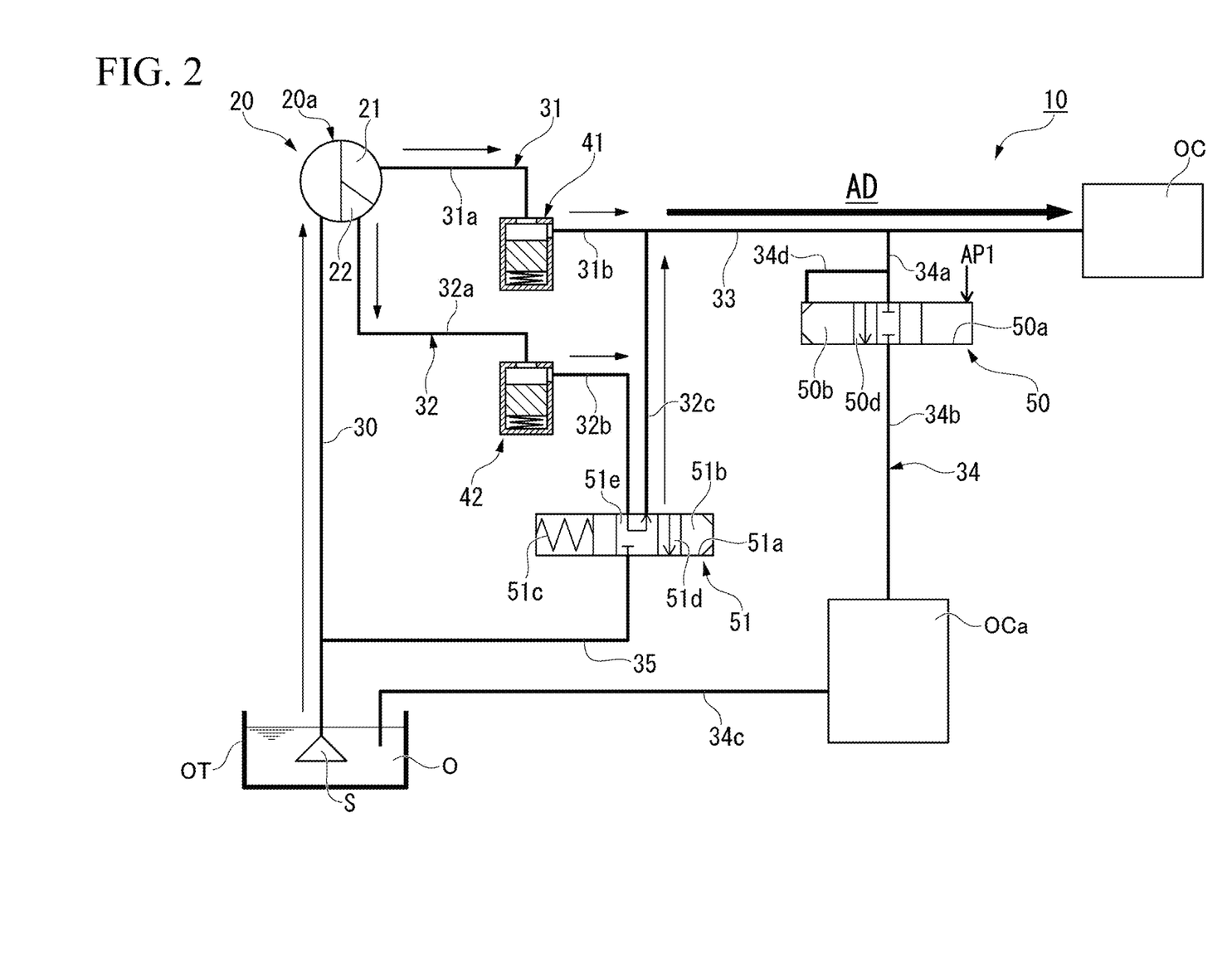
FIG. 2 is a diagram schematically showing another actuated state of the hydraulic control apparatus of the first example embodiment.
Figure 3:
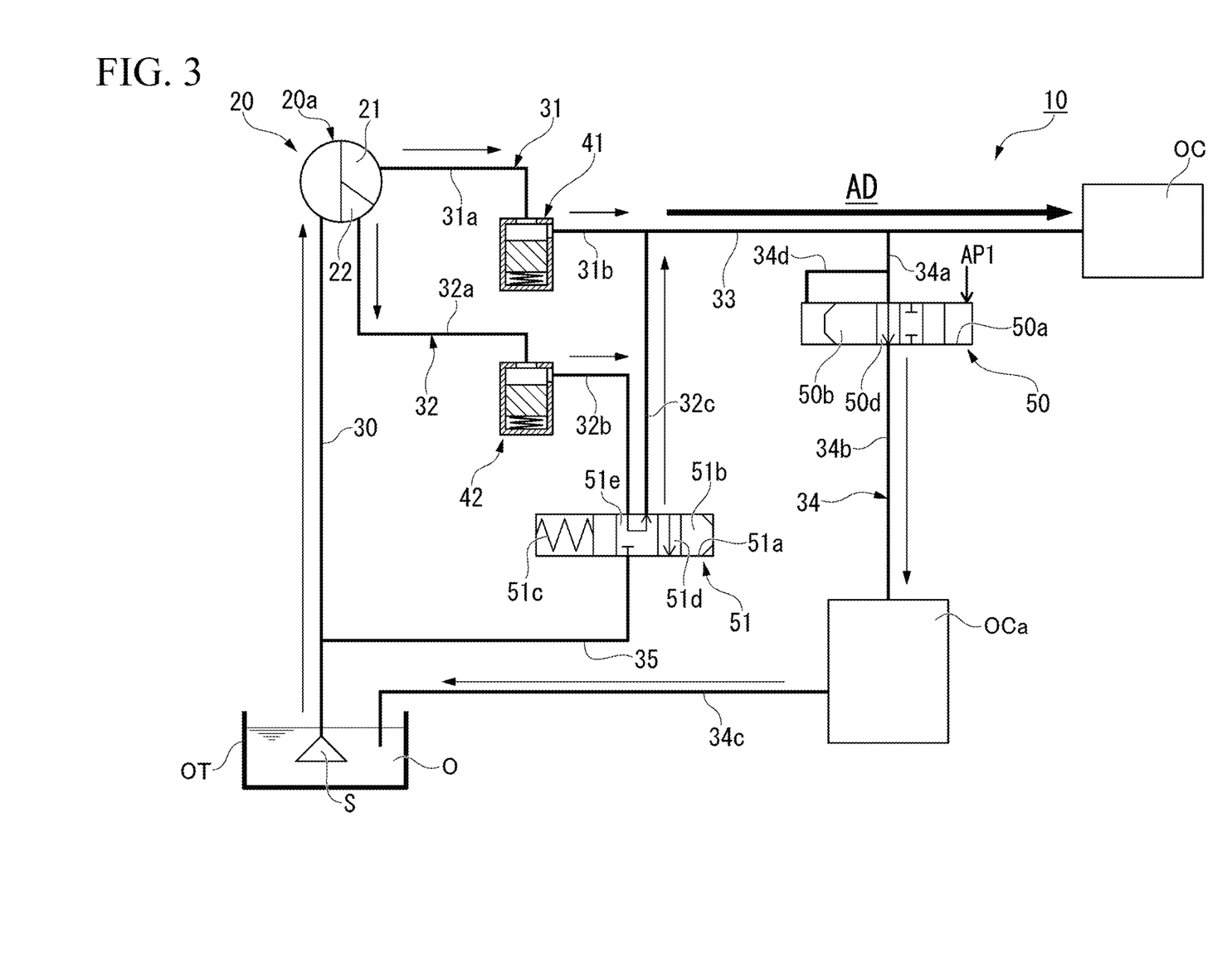
FIG. 3 is a diagram schematically showing yet another actuated state of the hydraulic control apparatus of the first example embodiment.

A hydraulic control apparatus 10 of the present example embodiment shown in FIGS. 1 to 3 controls a control target OC using a hydraulic pressure. The hydraulic control apparatus 10 is mounted, for instance, in a vehicle. The control target OC is, for instance, an automatic transmission for the vehicle. As shown in FIGS. 1 to 3, the hydraulic control apparatus 10 includes an oil pump assembly 20, an input-side oil passage 30, a first oil passage 31, a second oil passage 32, an output-side oil passage 33, a first connection oil passage 34, a second connection oil passage 35, a directional control valve 51, a pressure regulating valve 50, a first check valve 41, and a second check valve 42.

The oil pump assembly 20 is, for instance, a mechanical pump that is driven by an engine of the vehicle, and sends oil O. The oil pump assembly 20 has a first discharge port 21 and a second discharge port 22. The oil pump assembly 20 is driven, and thereby the oil O is discharged from the first discharge port 21 and the second discharge port 22. In the present example embodiment, a hydraulic pressure of the oil O discharged from the second discharge port 22 is higher than a hydraulic pressure of the oil O discharged from the first discharge port 21. In the present example embodiment, the oil pump assembly 20 has an oil pump 20a that has both the first discharge port 21 and the second discharge port 22.

The input-side oil passage 30 is an oil passage through which the oil O suctioned from an oil tank OT, in which the oil O is stored, into the oil pump assembly 20 passes. In the present example embodiment, the oil O suctioned into the oil pump 20a passes through the input-side oil passage 30. A strainer S disposed in the oil O stored in the oil tank OT is connected to an end of the input-side oil passage 30 which is adjacent to the oil tank OT.

The first oil passage 31 is an oil passage into which the oil O discharged from the first discharge port 21 flows. The first oil passage 31 joins the first discharge port 21 and the output-side oil passage 33. The first check valve 41 is provided on the first oil passage 31. The first check valve 41 is provided, and thereby the first oil passage 31 is divided into a first portion 31a and a second portion 31b. The first portion 31a is an oil passage that joins the first discharge port 21 and the first check valve 41. The second portion 31b is an oil passage that joins the first check valve 41 and the output-side oil passage 33.

The second oil passage 32 is an oil passage into which the oil O discharged from the second discharge port 22 flows. The second oil passage 32 joins the second discharge port 22 and the output-side oil passage 33. The second check valve 42 and the directional control valve 51 are provided on the second oil passage 32. The second check valve 42 and the directional control valve 51 are provided, and thereby the second oil passage 32 is divided into a first portion 32a, a second portion 32b, and a third portion 32c. The first portion 32a is an oil passage that joins the second discharge port 22 and the second check valve 42. The second portion 32b is an oil passage that joins the second check valve 42 and the directional control valve 51. The third portion 32c is an oil passage that joins the directional control valve 51 and the output-side oil passage 33. In the present example embodiment, the third portion 32c is joined to a portion of the output-side oil passage 33 to which the second portion 31b of the first oil passage 31 is joined.

The output-side oil passage 33 is an oil passage into which the oil O from the first oil passage 31 and the oil O from the second oil passage 32 flow. The output-side oil passage 33 joins the first oil passage 31 and the second oil passage 32 to the control target OC. The output-side oil passage 33 supplies a hydraulic pressure of the oil O to the control target OC.

The first connection oil passage 34 is an oil passage that joins the output-side oil passage 33 and the oil tank OT. The pressure regulating valve 50 is provided on the first connection oil passage 34. Further, a portion of the first connection oil passage 34 which is nearer to the oil tank OT than the pressure regulating valve 50 passes through a portion OCa of the control target OC. The portion OCa of the control target OC is, for instance, a gear of the automatic transmission for the vehicle. The oil O passing through the first connection oil passage 34 is supplied to the portion OCa, for instance, as a lubricant. Thus, lubricity of the portion OCa can be improved using some of the oil O discharged from the oil pump assembly 20.

The pressure regulating valve 50 and the portion OCa of the control target OC are provided, and thereby the first connection oil passage 34 is divided into a first portion 34a, a second portion 34b, and a third portion 34c. The first portion 34a is an oil passage that joins the output-side oil passage 33 and the pressure regulating valve 50. The first portion 34a is joined to a portion of the output-side oil passage 33 which is located nearer to the control target OC than a portion to which the first oil passage 31 and the second oil passage 32 are joined. The second portion 34b is an oil passage that joins the pressure regulating valve 50 and the portion OCa. The third portion 34c is an oil passage that joins the portion OCa and the oil tank OT.

The second connection oil passage 35 is an oil passage that joins the directional control valve 51 provided on the second oil passage 32 to the input-side oil passage 30.

The "oil passage" used herein may be a path along which the oil O flows, and may be not necessarily be made of, for instance, a hole. For example, in a case where the oil tank OT is disposed on a side below of the portion OCa, the third portion 34c of the first connection oil passage 34 may be a path along which the oil O supplied to the portion OCa falls down and directly returns to the oil tank OT.

The directional control valve 51 is provided at a portion of the second oil passage 32 which is provided between the second check valve 42 and the output-side oil passage 33. The directional control valve 51 has a spool hole part 51a, a spool valve 51b, and an elastic portion 51c. The spool hole part 51a extends in a left-right direction in FIGS. 1 to 3. Although not shown, a cross-sectional shape of the spool hole part 51a is, for instance, a circular shape. In the following description, the left-right direction in FIGS. 1 to 3 is referred to simply as "left-right direction." Further, the left side in the left-right direction in FIGS. 1 to 3 is referred to simply as "left side," and the right side in the left-right direction in FIGS. 1 to 3 is referred to simply as "right side." The left-right direction, the left side, and the right side are simply names for describing relative positional relationships between respective parts, and an actual arrangement relationship or the like may be, for instance, an arrangement relationship other than an arrangement relationship indicated by these names.

The spool valve 51b has a columnar shape that extends in the left-right direction. The spool valve 51b is disposed inside the spool hole part 51a to be movable in the left-right direction. The spool valve 51b has a first coupling oil passage part 51d and a second coupling oil passage part 51e.

The first coupling oil passage part 51d can connect the second portion 32b and the second connection oil passage 35. As shown in FIG. 1, in the case where the first coupling oil passage part 51d connects the second portion 32b and the second connection oil passage 35, the oil O flowing from the second portion 32b of the second oil passage 32 to the input-side oil passage 30 passes through the first coupling oil passage part 51d.

The second coupling oil passage part 51e can connect the second portion 32b and the third portion 32c. As shown in FIGS. 2 and 3, in the case where the second coupling oil passage part 51e connects the second portion 32b and the third portion 32c, the oil O flowing from the second portion 32b of the second oil passage 32 to the third portion 32c passes through the second coupling oil passage part 51e. In the present example embodiment, the second coupling oil passage part 51e is located on a left side of the first coupling oil passage part 51d.

The elastic portion 51c is disposed in an inner portion of the spool hole part 51a which is located on a left side of the spool valve 51b. The elastic portion 51c pushes the spool valve 51b from a left side to a right side.

As shown in FIG. 1, the oil O from a hydraulic pressure source AP2 flows into an inner portion of the spool hole part 51a which is located on a right side of the spool valve 51b. Thus, the spool valve 51b moves in the left-right direction depending on a balance between a rightward force applied by the elastic portion 51c and a leftward force applied by a hydraulic pressure of the oil O that flows from the hydraulic pressure source AP2 into the spool hole part 51a. The spool valve 51b moves in the left-right direction, and thereby the first coupling oil passage part 51d and the second coupling oil passage part 51e move in the left-right direction, and the hydraulic control apparatus 10 is changed between a state in which the second and third portions 32b and 32c of the second oil passage 32 are coupled and a state in which the second and third portions 32b and 32c of the second oil passage 32 are uncoupled.

In the present example embodiment, in a state in which the spool valve 51b receives a hydraulic pressure from the hydraulic pressure source AP2, the second portion 32b and the second connection oil passage 35 are connected by the first coupling oil passage part 51d. In this case, the second and third portions 32b and 32c of the second oil passage 32 are made to be uncoupled. Thus, in the state in which the spool valve 51b receives a hydraulic pressure from the hydraulic pressure source AP2, the directional control valve 51 allows a flow of the oil O from the second oil passage 32 to the input-side oil passage 30 via the second connection oil passage 35, and checks a flow of the oil O from the second oil passage 32 to the output-side oil passage 33. In this state, the hydraulic control apparatus 10 is brought into a half discharged state HD in which only the oil O discharged from the first discharge port 21 is supplied from the output-side oil passage 33 to the control target OC.

On the other hand, as shown in FIGS. 2 and 3, in a state in which the spool valve 51b does not receive a hydraulic pressure from the hydraulic pressure source AP2, the spool valve 51b moves to the right side relative to the position shown in FIG. 1 due to an elastic force of the elastic portion 51c, and the second portion 32b and the third portion 32c are connected by the second coupling oil passage part 51e. In this case, the second portion 32b and the second connection oil passage 35 are made to be uncoupled. Thus, in the state in which the spool valve 51b does not receive a hydraulic pressure from the hydraulic pressure source AP2, the directional control valve 51 allows a flow of the oil O from the second oil passage 32 to the output-side oil passage 33, and checks a flow of the oil O from the second oil passage 32 to the input-side oil passage 30 via the second connection oil passage 35. In this state, the hydraulic control apparatus 10 is brought into a full discharged state AD in which both the oil O discharged from the first discharge port 21 and the oil O discharged from the second discharge port 22 are supplied from the output-side oil passage 33 to the control target OC.

As described above, depending on the hydraulic pressure applied to the spool valve 51b from the hydraulic pressure source AP2, the directional control valve 51 switches between a state in which the oil O discharged from the second discharge port 22 to the second oil passage 32 flows to the output-side oil passage 33 and a state in which the oil O discharged from the second discharge port 22 to the second oil passage 32 flows to the second connection oil passage 35. Thus, the hydraulic control apparatus 10 is switched between the half discharged state HD and the full discharged state AD. In FIG. 1, the case where the hydraulic control apparatus 10 is in the half discharged state HD is shown. In FIGS. 2 and 3, the case where the hydraulic control apparatus 10 is in the full discharged state AD is shown.

The pressure regulating valve 50 has a spool hole part 50a and a spool valve 50b. The spool hole part 50a extends in the left-right direction. The spool valve 50b has a columnar shape that extends in the left-right direction. The spool valve 50b is disposed inside the spool hole part 50a to be movable in the left-right direction. The spool valve 50b has a coupling oil passage part 50d. The coupling oil passage part 50d can connect the first portion 34a and the second portion 34b. As shown in FIG. 3, in the case where the coupling oil passage part 50d connects the first portion 34a and the second portion 34b, the oil O flowing from the output-side oil passage 33 to the oil tank OT via the first connection oil passage 34 passes through the coupling oil passage part 50d.

The hydraulic control apparatus 10 further includes a branch oil passage 34d that joins a portion of the first connection oil passage 34 which joins the output-side oil passage 33 and the pressure regulating valve 50, namely the first portion 34a, and an inner portion of the spool hole part 50a which is located on the left side of the spool valve 50b. The oil O from the output-side oil passage 33 flows into the inner portion of the spool hole part 50a, which is located on the left side of the spool valve 50b, via the branch oil passage 34d. The oil O from a hydraulic pressure source AP1 flows into an inner portion of the spool hole part 50a which is located on the right side of the spool valve 50b.

Thus, the spool valve 50b moves in the left-right direction depending on a balance between a rightward force applied by a hydraulic pressure of the oil O in the output-side oil passage 33 flowing from the branch oil passage 34d into the spool hole part 50a and a leftward force applied by a hydraulic pressure of the oil O that flows from the hydraulic pressure source AP1 into the spool hole part 50a. The spool valve 50b moves in the left-right direction, and thereby the coupling oil passage part 50d moves in the left-right direction, and the hydraulic control apparatus 10 is changed between a state in which the first portion 34a and the second portion 34b are coupled and a state in which the first portion 34a and the second portion 34b are uncoupled.

In the pressure regulating valve 50, the state in which the first portion 34a and the second portion 34b are coupled is an open state in which a flow of the oil O from the output-side oil passage 33 to the oil tank OT in the first connection oil passage 34 is allowed. In the pressure regulating valve 50, the state in which the first portion 34a and the second portion 34b are uncoupled is a closed state in which a flow of the oil O from the output-side oil passage 33 to the oil tank OT in the first connection oil passage 34 is disallowed. That is, the pressure regulating valve 50 transitions between the open state and the closed state in association with the movement of the spool valve 50b in the left-right direction. In FIGS. 1 and 2, the case where the pressure regulating valve 50 is in the closed state is shown. In FIG. 3, the case where the pressure regulating valve 50 is in the open state is shown.

In a case where a value of the hydraulic pressure in the output-side oil passage 33 at a portion to which the first connection oil passage 34 is connected is greater than or equal to a prescribed value, the pressure regulating valve 50 is made to be open. In a case where the value of the hydraulic pressure in the output-side oil passage 33 at the portion to which the first connection oil passage 34 is connected is smaller than the prescribed value, the pressure regulating valve 50 is made to be closed. The prescribed value is greater than 0. The prescribed value is changed depending on the hydraulic pressure of the oil O supplied from the hydraulic pressure source AP1.

The first check valve 41 is a check valve that checks a flow of the oil O from the output-side oil passage 33 to the first discharge port 21. The first check valve 41 allows a flow of the oil O from the first discharge port 21 to the output-side oil passage 33 in the first oil passage 31. In the present example embodiment, a structure of the first check valve 41 is the same as that of the second check valve 42 except that a second elastic portion 46 to be described below is not provided.

Figure 4:
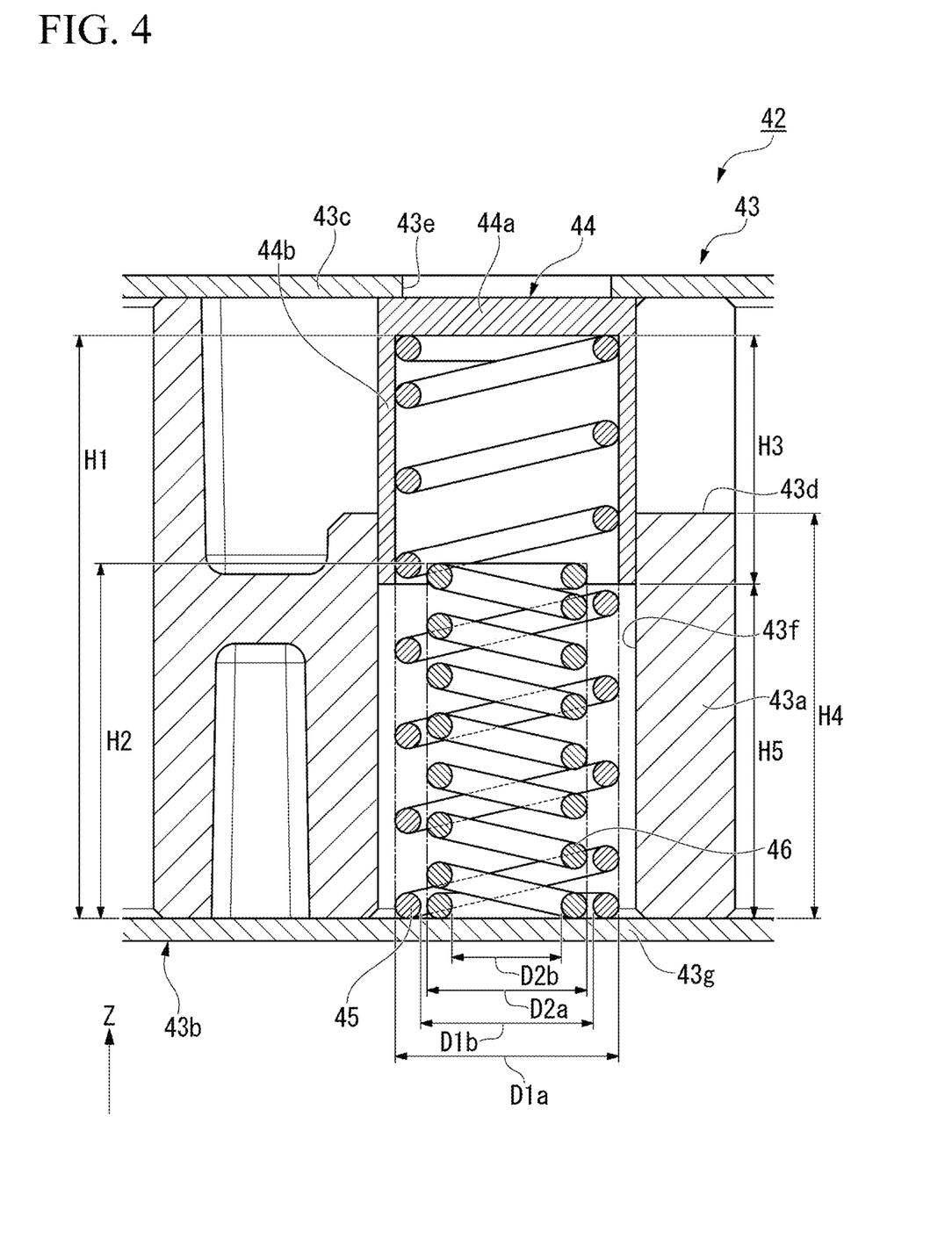
FIG. 4 is a sectional view showing one state of a second check valve of the first example embodiment.
Figure 5:
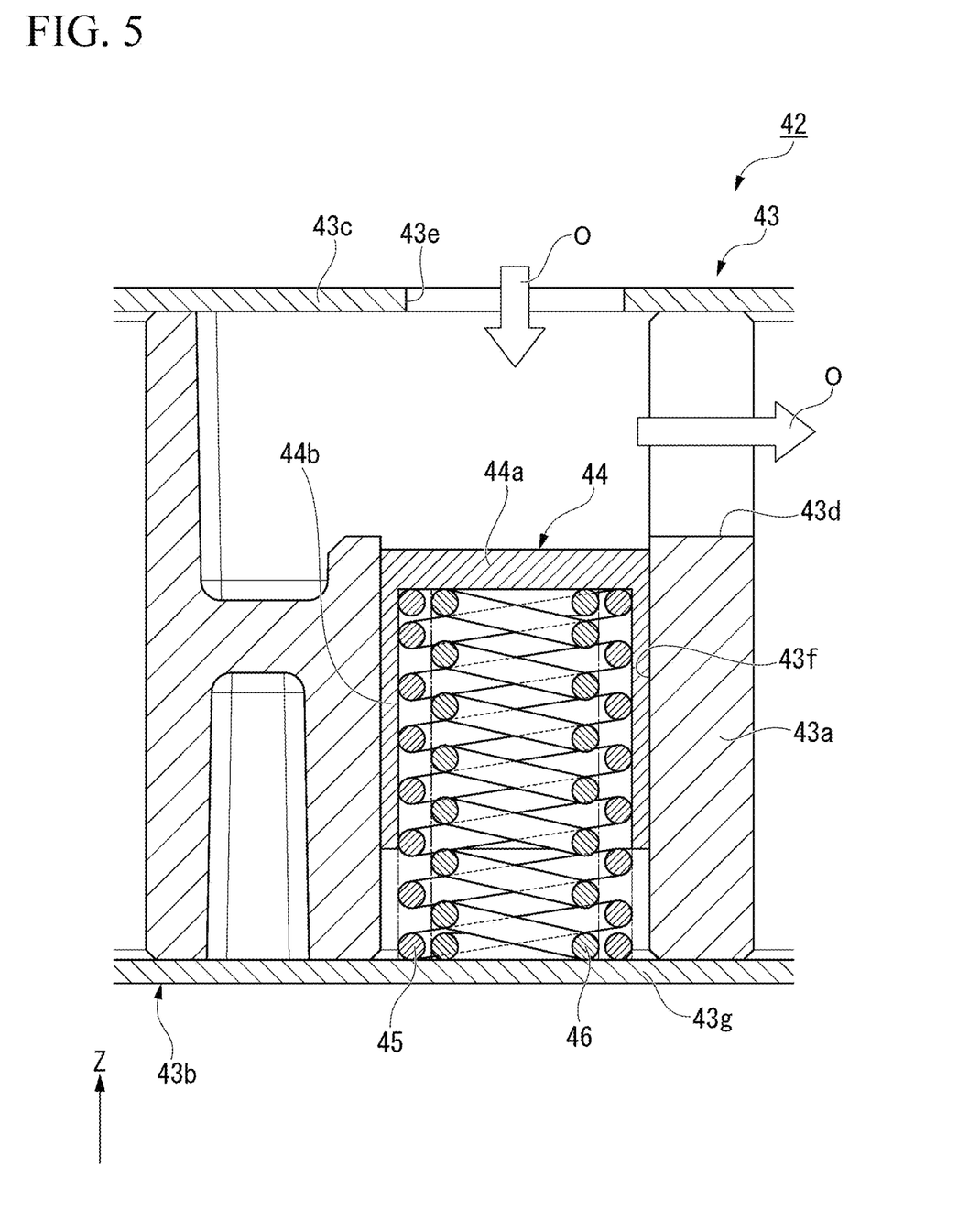
FIG. 5 is a sectional view showing another state of the second check valve of the first example embodiment.
Figure 6:
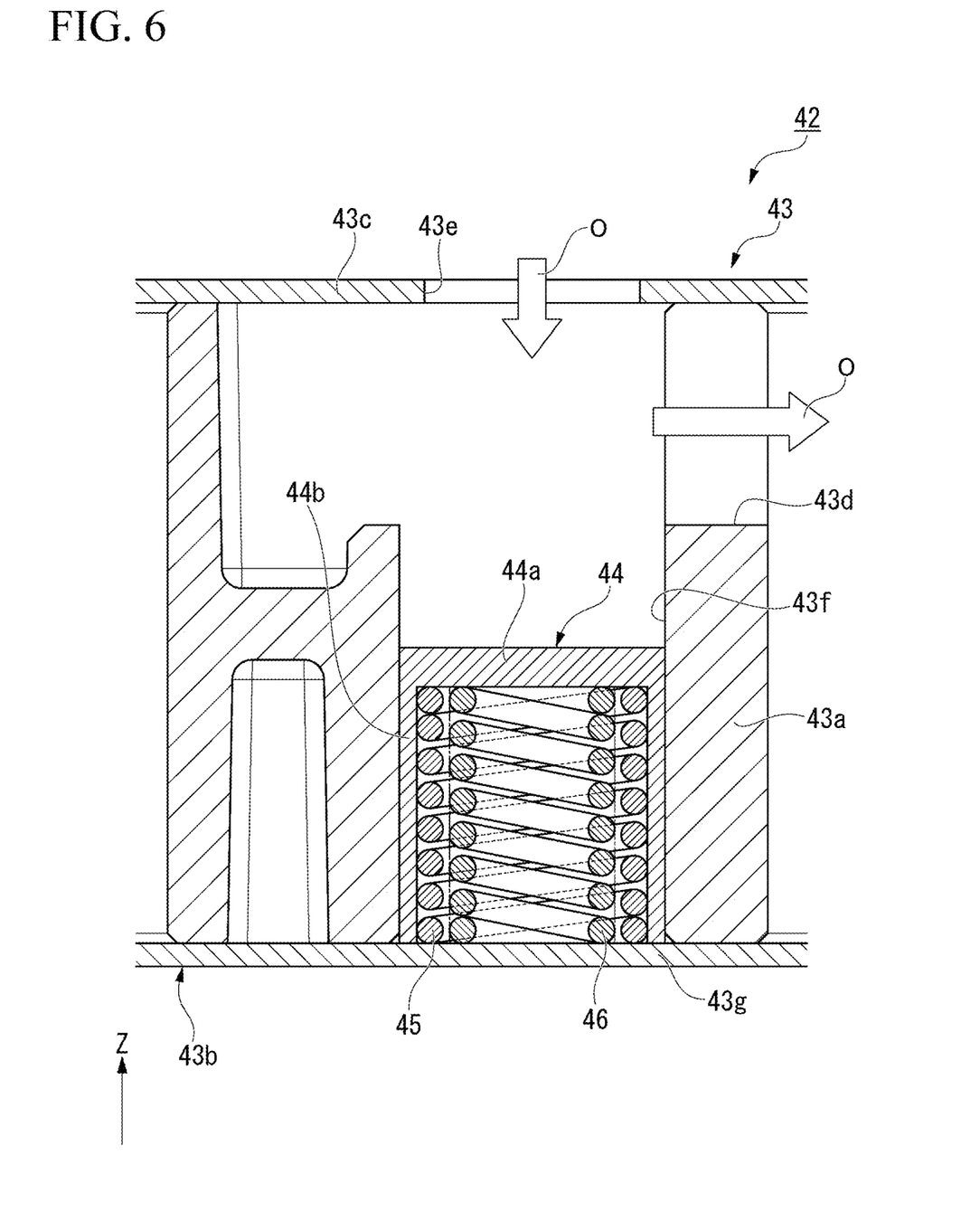
FIG. 6 is a sectional view showing yet another state of the second check valve of the first example embodiment.

The second check valve 42 is provided at a portion of the second oil passage 32 which is provided between the second discharge port 22 and the directional control valve 51. The second check valve 42 is a check valve that checks a flow of the oil O from the output-side oil passage 33 to the second discharge port 22. The second check valve 42 allows a flow of the oil O from the second discharge port 22 to the output-side oil passage 33 in the second oil passage 32. The second check valve 42 is a pressure regulating check valve that can regulates a hydraulic pressure in the second oil passage 32. As shown in FIGS. 4 to 6, the second check valve 42 has a housing 43, a valve 44, a first elastic portion 45, and a second elastic portion 46.

Here, a Z-axis direction shown in FIGS. 4 to 6 is a vertical direction in which a positive side is set as an upper side and a negative side is set as a lower side. In the present example embodiment, the vertical direction is equivalent to a predetermined direction, so that the lower side is equivalent to one side in the predetermined direction, and the upper side is equivalent to the other side in the predetermined direction.

The housing 43 has a main body 43a, a bottom plate 43b, and a top plate 43c. Each of the bottom plate 43b and the top plate 43c has the shape of a plate, a surface of which is directed in the vertical direction. The bottom plate 43b is fixed to a lower surface of the main body 43a. The top plate 43c is fixed to an upper surface of the main body 43a.

The housing 43 has a spool hole 43f, an inflow hole 43e, and an outflow hole 43d. The spool hole 43f is a hole that extends in the vertical direction and has a bottom 43g on a lower side thereof. Although not shown, the spool hole 43f has a circular shape when viewed in the vertical direction. For example, a lower opening of a through-hole that passes through the main body 43a in the vertical direction is blocked by the bottom plate 43b, and thereby the spool hole 43f is made. The bottom 43g is a part of the bottom plate 43b. A part of an upper opening of the spool hole 43f is blocked by the top plate 43c.

The inflow hole 43e is a hole that is located on an upper side of the spool hole 43f and is joined with an interior of the spool hole 43f. The inflow hole 43e passes through the top plate 43c in the vertical direction. Although not shown, the inflow hole 43e has a circular shape that is disposed coaxially with the spool hole 43f. An inner diameter of the inflow hole 43e is smaller than that of the spool hole 43f. The first portion 32a of the second oil passage 32 is connected to the inflow hole 43e.

The outflow hole 43d is a hole that is provided in an inner circumferential surface of the spool hole 43f and is joined with the interior of the spool hole 43f. The outflow hole 43d passes through a wall of the main body 43a in a horizontal direction orthogonal to the vertical direction. In the present example embodiment, the outflow hole 43d is provided in an upper end of the inner circumferential surface of the spool hole 43f. For example, an upper opening of a recess that is recessed downward from an upper surface of the main body 43a is blocked by the top plate 43c, and thereby the outflow hole 43d is made. The second portion 32b of the second oil passage 32 is connected to the outflow hole 43d.

The valve 44 is housed in the spool hole 43f to be movable in the vertical direction. In the present example embodiment, the valve 44 extends in the vertical direction, and has a covered cylindrical shape that opens downward. An outer diameter of the valve 44 is nearly the same as the inner diameter of the spool hole 43f. When the valve 44 moves in the vertical direction, the valve 44 moves while sliding in a state in which an outer circumferential surface thereof is in contact with the inner circumferential surface of the spool hole 43f. The outer diameter of the valve 44 is greater than the inner diameter of the inflow hole 43e.

The valve 44 has a valve body 44a and a tubular portion 44b. The valve body 44a has the shape of a plate, a surface of which is directed in the vertical direction. Although not shown, when viewed in the vertical direction, the valve body 44a has a circular shape disposed coaxially with the spool hole 43f and the inflow hole 43e.

The valve body 44a can open/close the inflow hole 43e. To be specific, in the present example embodiment, as shown in FIG. 4, an outer circumferential edge of the valve body 44a is in contact with a circumferential edge of the inflow hole 43e which constitutes a lower surface of the top plate 43c, and thereby the valve body 44a closes the inflow hole 43e. On the other hand, as shown in FIGS. 5 and 6, the valve body 44a is separated downward from the circumferential edge of the inflow hole 43e which constitutes the lower surface of the top plate 43c, thereby opening the inflow hole 43e.

The tubular portion 44b extends downward from the valve body 44a. In the present example embodiment, the tubular portion 44b extends downward from the outer circumferential edge of the valve body 44a. The tubular portion 44b has a cylindrical shape disposed coaxially with the valve body 44a. The tubular portion 44b opens downward. As shown in FIG. 4, a distance H3 between a lower end of the valve body 44a and a lower end of the tubular portion 44b in the vertical direction is shorter than a natural length H2 of the second elastic portion 46 in the vertical direction.

In the present example embodiment, the tubular portion 44b can open/close the outflow hole 43d. To be specific, in the present example embodiment, as shown in FIG. 4, in a state in which the valve body 44a closes the inflow hole 43e, the tubular portion 44b closes the outflow hole 43d by means of an outer circumferential surface thereof. On the other hand, as shown in FIGS. 5 and 6, in a state in which the valve body 44a opens the inflow hole 43e, the tubular portion 44b opens the outflow hole 43d.

The first elastic portion 45 is housed in the spool hole 43f between the valve body 44a and the bottom 43g in the vertical direction. In the present example embodiment, the first elastic portion 45 is a coil spring that extends in the vertical direction. A lower end of the first elastic portion 45 is in contact with an upper surface of the bottom 43g. An upper end of the first elastic portion 45 is in contact with a lower surface of the valve body 44a. The first elastic portion 45 applies an upward elastic force to the valve body 44a. The upper end of the first elastic portion 45 is housed in the tubular portion 44b.

The second elastic portion 46 is housed in the spool hole 43f between the valve body 44a and the bottom 43g in the vertical direction. In the present example embodiment, the second elastic portion 46 is a coil spring that extends in the vertical direction. An elastic modulus of the second elastic portion 46 is greater than that of the first elastic portion 45. As shown in FIG. 4, an inner diameter D2b of the second elastic portion 46 is smaller than an inner diameter D1b of the first elastic portion 45. An outer diameter D2a of the second elastic portion 46 is smaller than an outer diameter D1a of the first elastic portion 45 and the inner diameter D1b of the first elastic portion 45. In the present example embodiment, the second elastic portion 46 is located inside the first elastic portion 45.

The natural length H2 of the second elastic portion 46 in the vertical direction is shorter than that of the first elastic portion 45 in the vertical direction. The natural length of the first elastic portion 45 in the vertical direction is greater than a dimension of the first elastic portion 45 shown in FIG. 4 in the vertical direction. That is, in the state of FIG. 4 in which the valve body 44a closes the inflow hole 43e, the first elastic portion 45 is elastically deformed in the vertical direction by compression.

The natural length H2 of the second elastic portion 46 in the vertical direction is shorter than a distance H1 between the valve body 44a and the bottom 43g in the vertical direction when the valve body 44a closes the inflow hole 43e. For this reason, in the state of FIG. 4 in which the valve body 44a closes the inflow hole 43e, the second elastic portion 46 is not compressed by the valve body 44a and the bottom 43g in the vertical direction, and not elastically deformed. That is, in the state of FIG. 4 in which the valve body 44a closes the inflow hole 43e, the second elastic portion 46 does not apply an elastic force to the valve body 44a. In the present example embodiment, in the state of FIG. 4, a lower end of the second elastic portion 46 is in contact with the upper surface of the bottom 43g, and the second elastic portion 46 is disposed to be separated downward from the valve body 44a. The distance H1 is equivalent to a dimension of the first elastic portion 45 in the vertical direction in the state in which the valve body 44a closes the inflow hole 43e. The natural length of the first elastic portion 45 in the vertical direction is longer than the distance H1.

The "natural length" used herein is a dimension of the elastic portion in a state in which no external force is applied, and also includes a dimension of the elastic portion in a state in which the elastic portion is elastically deformed by a dead load if no external force is applied. That is, in the state shown in FIG. 4 of the present example embodiment, even in the case where the second elastic portion 46 is elastically deformed by a dead load, H2 is the natural length of the second elastic portion 46. Herein, an amount of elastic deformation caused by a dead load is ignored as being sufficiently small.

The natural length H2 of the second elastic portion 46 is shorter than a distance H4 between the bottom 43g and the outflow hole 43d in the vertical direction. For this reason, as shown in FIG. 4, in a state in which the second elastic portion 46 is disposed on the bottom 43g in the natural length, an upper end of the second elastic portion 46 is located below the outflow hole 43d. In the present example embodiment, the distance H4 between the bottom 43g and the outflow hole 43d in the vertical direction is a distance between the upper surface of the bottom 43g and a lower end of the outflow hole 43d in the vertical direction.

The natural length H2 of the second elastic portion 46 is longer than a distance H5 between the lower end of the tubular portion 44b and the upper surface of the bottom 43g in the vertical direction in the state in which the valve body 44a closes the inflow hole 43e. For this reason, as shown in FIG. 4, in the state in which the second elastic portion 46 is disposed on the bottom 43g in the natural length, the upper end of the second elastic portion 46 is housed in the tubular portion 44b.

A winding direction of the first elastic portion 45 and a winding direction of the second elastic portion 46 are opposite to each other. To be specific, for example, in a case where the first elastic portion 45 is configured to be wound in a direction in which it is located below as it proceeds clockwise when viewed from above, the second elastic portion 46 is configured to be wound in a direction in which it is located below as it proceeds counterclockwise when viewed from above.

In a state in which the oil pump assembly 20 is not actuated, that is, in a state in which the oil O is not discharged from the second discharge port 22, the second check valve 42 is brought into the state shown in FIG. 4 in which the valve 44 closes the inflow hole 43e and the outflow hole 43d. Thus, the second check valve 42 can hinder the oil O in the second portion 32b of the second oil passage 32 from flowing back to the first portion 32a, and checks a flow of the oil O from the output-side oil passage 33 to the second discharge port 22.

On the other hand, if the oil pump assembly 20 is actuated and the oil O is discharged from the second discharge port 22, the oil O from the first portion 32a of the second oil passage 32 applies a downward hydraulic pressure to the valve 44 via the inflow hole 43e. For this reason, the first elastic portion 45 is elastically deformed by compression, and the valve 44 moves downward. Thus, the inflow hole 43e and the outflow hole 43d are open, and the oil O flows from the first portion 32a to the second portion 32b via the inflow hole 43e, the spool hole 43f, and the outflow hole 43d in turn.

In the present example embodiment, as shown in FIG. 5, in a state in which the oil O is discharged from the second discharge port 22, the valve 44 moves at least down to a position at which the upper end of the valve 44 is located below the outflow hole 43d, and the valve body 44a is in contact with the upper end of the second elastic portion 46. The valve 44 moves between the position shown in FIG. 5 and the position shown in FIG. 6 in the vertical direction according to a change in the hydraulic pressure of the oil O passing through the second check valve 42. A lower end of the valve 44, that is, a lower end of the tubular portion 44b, is in contact with the upper surface of the bottom 43g at the position shown in FIG. 6. When the valve 44 moves between the position shown in FIG. 5 and the position shown in FIG. 6, the second elastic portion 46 is elastically deformed in the vertical direction by compression. Thus, the second elastic portion 46 applies an upward elastic force to the valve body 44a in a state in which the valve body 44a opens the inflow hole 43e.

If the hydraulic pressure of the oil O passing through the second check valve 42 is increased, the valve 44 moves downward against an elastic force from the second elastic portion 46. If the valve 44 moves downward, a volume of a portion of the spool hole 43f to which the oil O flows is increased, and thus a hydraulic pressure of the oil O passing through the second check valve 42, that is, a hydraulic pressure of the oil O flowing through the second oil passage 32, can be reduced.

On the other hand, if the hydraulic pressure of the oil O passing through the second check valve 42 is reduced, the valve 44 moves upward due to the elastic force from the second elastic portion 46. If the valve 44 moves upward, the volume of the portion of the spool hole 43*f* to which the oil O flows is decreased, and thus the hydraulic pressure of the oil O passing through the second check valve 42, that is, the hydraulic pressure of the oil O flowing through the second oil passage 32, can be increased. In this way, the second check valve 42 that is a pressure regulating check valve can regulate the hydraulic pressure in the second oil passage 32.

In the present example embodiment, the second check valve 42 nearly maintains, for instance, the state shown in FIG. 5 in the half discharged state HD. On the other hand, the valve 44 moves between the state shown in FIG. 5 and the state shown in FIG. 6 in the full discharged state AD, and the second check valve 42 regulates the hydraulic pressure of the oil O in the second oil passage 32. A stroke of the valve 44 moving in the vertical direction in the full discharged state AD is about 50% or more and 70% or less of a stroke in which the valve 44 moves in the vertical direction, for instance, when the hydraulic control apparatus 10 is changed into the half discharged state HD from a state in which the oil pump assembly 20 is not actuated. The stroke in which the valve 44 moves in the vertical direction when the hydraulic control apparatus 10 is changed into the half discharged state HD from the state in which the oil pump assembly 20 is not actuated is equivalent to, for instance, a difference between a position of the valve 44 in the vertical direction in FIG. 4 and a position of the valve 44 in the vertical direction in FIG. 5.

In a case where the hydraulic pressure in the second oil passage 32 is changed even in the half discharged state HD, the valve 44 moves in the vertical direction depending on the change in hydraulic pressure, the second check valve 42 regulates the hydraulic pressure in the second oil passage 32.

According to the present example embodiment, the second check valve 42 is a pressure regulating check valve that can regulate the hydraulic pressure in the second oil passage 32. For this reason, when the hydraulic control apparatus 10 is switched from the half discharged state HD to the full discharged state AD, even in the case where the flow rate of the oil O in the output-side oil passage 33 is abruptly increased, the hydraulic pressure in the second oil passage 32 is regulated by the second check valve 42, and the hydraulic pressure in the output-side oil passage 33 can be reduced. Thus, when switched to the full discharged state AD, an abrupt rise in the hydraulic pressure supplied to the control target OC can be curbed.

To be specific, the second check valve 42 has the second elastic portion 46 that applies an upward elastic force to the valve body 44*a* in the state in which the inflow hole 43*e* is open, in addition to the first elastic portion 45. For this reason, in the state in which the valve body 44*a* opens the inflow hole 43*e*, the valve 44 is further movable downward while receiving the upward elastic force. Thus, even if the hydraulic pressure in the second oil passage 32, that is, the hydraulic pressure in the output-side oil passage 33, is raised by switching to the full discharged state AD, the valve 44 moves downward against the second elastic portion 46, and the volume of the portion of the spool hole 43*f* to which the oil O flows can be increased. Therefore, the hydraulic pressure in the second oil passage 32 can be lowered, and the hydraulic pressure in the output-side oil passage 33 can be lowered.

As described above, according to the present example embodiment, a pressure regulating function is added to the second check valve 42 that is the check valve, the abrupt change in the hydraulic pressure in the output-side oil passage 33 when switched from the half discharged state HD to the full discharged state AD can be curbed without providing, for instance, a separate accumulator. For this reason, the increase in the number of components of the hydraulic control apparatus 10 can be curbed, and the increase in the size of the hydraulic control apparatus 10 can also be curbed. As described above, according to the present example embodiment, in the hydraulic control apparatus 10, the abrupt change in the hydraulic pressure supplied to the control target OC can be curbed while curbing the increase in the number of components and the increase in size.

Further, the second elastic portion 46 is added in addition to the first elastic portion 45, the pressure regulating function can be added to the second check valve 42 in addition to the function as the check valve. For this reason, the structure of the second check valve 42 acting as the pressure regulating check valve can be curbed from being complicated.

For example, even in a case where the second elastic portion 46 is not provided, if the valve 44 is made not to completely move down in the half discharged state HD by adjusting the elastic modulus of the first elastic portion 45, when switched to the full discharged state AD, and the hydraulic pressure is increased, the volume of the portion of the spool hole 43*f* through which the oil O passes can be increased by further moving the valve 44 down. For this reason, the hydraulic pressure can also be regulated only by the first elastic portion 45. However, to suitably absorb a change in hydraulic pressure when switched to the full discharged state AD with this constitution, there is a need to make an elastic modulus of the first elastic portion 45 greater than that of the first elastic portion 45 upon simply functioning as the check valve. If the elastic modulus of the first elastic portion 45 is increased, it is difficult to elastically deform the first elastic portion 45 and to move the valve 44 down in the half discharged state HD. For this reason, in the state in which the oil O is discharged from the second discharge port 22, the inflow hole 43*e* and the outflow hole 43*d* cannot be sufficiently opened in some cases, and a pressure loss in the check valve may be increased.

In contrast, according to the present example embodiment, the second elastic portion 46 is separately provided, and the natural length H2 of the second elastic portion 46 in the vertical direction is made shorter than the distance H1 between the valve body 44*a* and the bottom 43*g* in the vertical direction when the valve body 44*a* closes the inflow hole 43*e*. For this reason, when the second check valve 42 functions as the check valve that simply opens/closes the inflow hole 43*e*, the second elastic portion 46 does not apply an elastic force to the valve body 44*a*, and the valve body 44*a* receives an elastic force from only the first elastic portion 45. Thus, the elastic modulus of the first elastic portion 45 is made small such as to suitably function as the check valve, and thereby even in the case of the half discharged state HD, the valve 44 is easy to sufficiently push down, and the inflow hole 43*e* and the outflow hole 43*d* can be suitably open. Therefore, occurrence of the pressure loss at the second check valve 42 can be curbed.

On the other hand, in the state in which the valve body 44*a* opens the inflow hole 43*e*, the second elastic portion 46 also applies an upward elastic force to the valve body 44*a*. For this reason, in the state in which the valve body 44*a* opens the inflow hole 43*e*, both the elastic force of the first elastic portion 45 and the elastic force of the second elastic portion 46 are applied to the valve body 44*a*, and thereby the state of the hydraulic control apparatus 10 is substantially equal to a state in which the elastic moduli of the elastic portions that apply an elastic force to the valve body 44*a* become higher. Thus, the change in hydraulic pressure when switched to the full discharged state AD by movement of the valve 44 in the vertical direction can be suitably absorbed.

As described above, the two elastic portions that are the first elastic portion 45 and the second elastic portion 46 are provided. Thereby, the elastic moduli of the elastic portions that substantially apply an elastic force to the valve body 44*a* are changed by changing the number of elastic portions that apply an elastic force to the valve body 44*a* to differ between when functioning as the check valve and when functioning as the pressure regulating valve. Thus, the function as the check valve and the function as the pressure regulating valve can be suitably reconciled.

Further, as described above, the second check valve 42 is provided on the second oil passage 32, and thus a backflow of the oil O from the output-side oil passage 33 to the second discharge port 22 can be curbed. For this reason, in a state in which the oil pump assembly 20 is not actuated, the oil O in the second oil passage 32 and the oil O in the output-side oil passage 33 can be curbed from being discharged to the oil tank OT via the oil pump assembly 20. Thus, an inner portion of the second oil passage 32 which is located nearer to the output-side oil passage 33 than the second check valve 42, and the inside of the output-side oil passage 33 are easy to occur as an oil-tight state. Therefore, immediately after the oil pump assembly 20 is actuated, a hydraulic pressure is easily applied to the control target OC, and responsiveness of the hydraulic control apparatus 10 can be improved. Further, the oil O in the control target OC can also be curbed from being discharged to the oil tank OT.

Further, according to the present example embodiment, as described above, even if the oil pump assembly 20 starts actuation and the second check valve 42 is made to be open, the valve 44 does not completely move down because the second elastic portion 46 is provided. That is, in the state in which the second check valve 42 is open, the valve 44 can be held at a position that is nearer to the inflow hole 43*e* than the case where the second elastic portion 46 is not provided. For this reason, when the oil pump assembly 20 stops actuation, a moving distance of the valve 44 that moves until the inflow hole 43*e* is closed can be shortened. Thus, responsiveness of the second check valve 42 acting as the check valve can be improved.

Further, according to the present example embodiment, the first elastic portion 45 and the second elastic portion 46 are coil springs, and one of the first elastic portion 45 and the second elastic portion 46 is located inside the other of the first elastic portion 45 and the second elastic portion 46. For this reason, in comparison with a case where the first elastic portion 45 and the second elastic portion 46 are arranged in a horizontal direction orthogonal to the vertical direction, the second check valve 42 can be downsized in a horizontal direction. Further, positions of the first and second elastic portions 45 and 46 can be curbed from being mutually shifted.

Further, according to the present example embodiment, the valve 44 has the tubular portion 44*b*, and the upper end of the first elastic portion 45 is housed in the tubular portion 44*b*. For this reason, the first elastic portion 45 can be curbed from being shifted relative to the valve body 44*a* in a horizontal direction by the tubular portion 44*b*. Further, the second elastic portion 46 is located inside the first elastic portion 45. For this reason, along with the first elastic portion 45, the second elastic portion 46 can be curbed from being shifted relative to the valve body 44*a* in a horizontal direction. Further, a malfunction of, for instance, the second elastic portion 46 being sandwiched between the tubular portion 44*b* and the bottom 43*g* can be curbed. Further, the distance H3 between the lower end of the valve body 44*a* and the lower end of the tubular portion 44*b* in the vertical direction is smaller than the natural length H2 of the second elastic portion 46 in the vertical direction. For this reason, before the valve body 44*a* comes into contact with the second elastic portion 46, the tubular portion 44*b* does not come into contact with the bottom 43*g*, and the second elastic portion can be elastically deformed by compression during pressure regulation.

Further, according to the present example embodiment, the winding direction of the first elastic portion 45 and the winding direction of the second elastic portion 46 are opposite to each other. For this reason, even if the second elastic portion 46 is disposed inside the first elastic portion 45, a part of the second elastic portion 46 can be curbed from being pinched in a gap between turns of the first elastic portion 45. Further, a part of the first elastic portion 45 can be curbed from being pinched in a gap between turns of the second elastic portion 46. That is, the first elastic portion 45 and the second elastic portion 46 can be curbed from being mutually jammed. Therefore, the elastic deformation of one of the first elastic portion 45 and the second elastic portion 46 in the vertical direction can be curbed from being obstructed by the other elastic portion.

Further, according to the present example embodiment, the elastic modulus of the second elastic portion 46 is larger than that of the first elastic portion 45. For this reason, when the second elastic portion 46 applies an elastic force to the valve body 44*a*, and the second check valve 42 functions as the pressure regulating valve, a change in hydraulic pressure can be more suitably absorbed. Thus, even if the elastic modulus of the first elastic portion 45 becomes relatively small, a change in hydraulic pressure can be suitably adjusted, and thus when the second check valve 42 functions as the check valve, a stroke of the valve 44 in the vertical direction can be increased. Therefore, when the inflow hole 43*e* is open, the valve 44 can be largely lowered, and the inflow hole 43*e* and the outflow hole 43*d* can be open more suitably. For this reason, the pressure loss in the second check valve 42 can be further curbed from increasing.

Further, according to the present example embodiment, the natural length H2 of the second elastic portion 46 in the vertical direction is shorter than the distance H4 between the bottom 43*g* and the outflow hole 43*d* in the vertical direction. Here, the valve 44 in the half discharged state HD is at least pushed down until the valve body 44*a* comes into contact with the second elastic portion 46. For this reason, the natural length H2 is made shorter than the distance H4, and thereby the entire valve 44 is easily lowered below the outflow hole 43*d* when the valve body 44*a* opens the inflow hole 43*e*. Thus, the outflow hole 43*d* can be suitably open, and the pressure loss in the second check valve 42 can be further curbed from increasing.

Further, according to the present example embodiment, the pressure regulating valve 50 in which an open state and a closed state are switched by a value of the hydraulic pressure of the output-side oil passage 33 is provided on the first connection oil passage 34 joined to the output-side oil passage 33. For this reason, a change in pressure in the output-side oil passage 33 can be further curbed. To be specific, in a case where the hydraulic pressure of the oil O in the output-side oil passage 33 becomes more than or equal to a prescribed value, the pressure regulating valve 50 becomes in the open state, and some of the oil O in the output-side oil passage 33 can be discharged to the oil tank OT via the first connection oil passage 34. For this reason, the hydraulic pressure in the output-side oil passage 33 can be reduced. On the other hand, in a case where the hydraulic pressure in the output-side oil passage 33 becomes less than the prescribed value, the pressure regulating valve 50 becomes in the closed state. For this reason, the oil O in the output-side oil passage 33 is not discharged from the first connection oil passage 34, and the hydraulic pressure in the output-side oil passage 33 rises. In this way, the hydraulic pressure in the output-side oil passage 33 can be regulated. Further, the portion OCa is disposed in the course of the first connection oil passage 34, and thereby the oil O can be supplied to the portion OCa.

For example, in a case where the pressure regulation of the output-side oil passage 33 is performed only by the pressure regulating valve 50 without providing the pressure regulating function to the second check valve 42, if the pressure regulating valve 50 does not become from the closed state to the open state, the hydraulic pressure in the output-side oil passage 33 cannot be reduced. For this reason, a time lag occurs between after being switched to the full discharged state AD and until the pressure regulating valve 50 becomes the open state by moving the spool valve 50b. Thus, the hydraulic pressure in the output-side oil passage 33 rises abruptly, and a surge pressure occurs. Further, due to this surge pressure, the pressure regulating valve 50 is too open, and the hydraulic pressure in the output-side oil passage 33 is easily made lower than a desired value. For this reason, the hydraulic pressure in the output-side oil passage 33 repeats a rise and a fall with respect to the desired value, and a time is required until the hydraulic pressure is regulated to the desired value. In this way, in the pressure regulation caused only by the pressure regulating valve 50, without being able to follow up a change in the hydraulic pressure in the output-side oil passage 33 when switched from the half discharged state HD to the full discharged state AD, the change in the hydraulic pressure in the output-side oil passage 33 cannot be sufficiently curbed in some cases.

In contrast, according to the second check valve 42, the hydraulic pressure in the output-side oil passage 33 rises, and the valve 44 is pushed down, and thereby the volume of the portion through which the oil O passes in the spool hole 43f can be increased immediately. For this reason, it is possible to immediately respond to the change in the hydraulic pressure in the output-side oil passage 33 and to curb occurrence of the surge pressure as described above.

Further, according to the present example embodiment, the first check valve 41 is provided on the first oil passage 31. For this reason, the backflow of the oil O from the output-side oil passage 33 to the first discharge port 21 can be curbed. Thus, in the state in which the oil pump assembly 20 is not actuated, the oil O in the first oil passage 31 and the oil O in the output-side oil passage 33 can be curbed from being discharged to the oil tank OT via the oil pump assembly 20. Therefore, an inner portion of the first oil passage 31 which is located nearer to the output-side oil passage 33 than the first check valve 41, and the inside of the output-side oil passage 33 are easy to be made to occur as an oil-tight state. For this reason, immediately after the oil pump assembly 20 is actuated, a hydraulic pressure is more easily applied to the control target OC. Further, the oil O in the control target OC can also be curbed from being discharged to the oil tank OT.

Further, according to the present example embodiment, the directional control valve 51 that switches between the state in which the oil O discharged from the second discharge port 22 to the second oil passage 32 flows to the output-side oil passage 33 and the state in which the oil O discharged from the second discharge port 22 to the second oil passage 32 flows to the second connection oil passage 35. For this reason, the switching of the directional control valve 51 is controlled, for instance, by the hydraulic pressure source AP2 as described above, and thereby the state of the hydraulic control apparatus 10 can be easily switched between the half discharged state HD and the full discharged state AD.

Further, according to the present example embodiment, the oil pump assembly 20 includes the oil pump 20a that has both the first discharge port 21 and the second discharge port 22. For this reason, the number of oil pumps 20a can be reduced, and the oil pump assembly 20 can be downsized. Further, even in a case where the oil O is discharged from one oil pump 20a to two discharge ports in this way, the directional control valve 51 as described above is provided, and thus the half discharged state HD and the full discharged state AD can be switched while continuously actuating the oil pump 20a.

Second Example Embodiment

Figure 7:
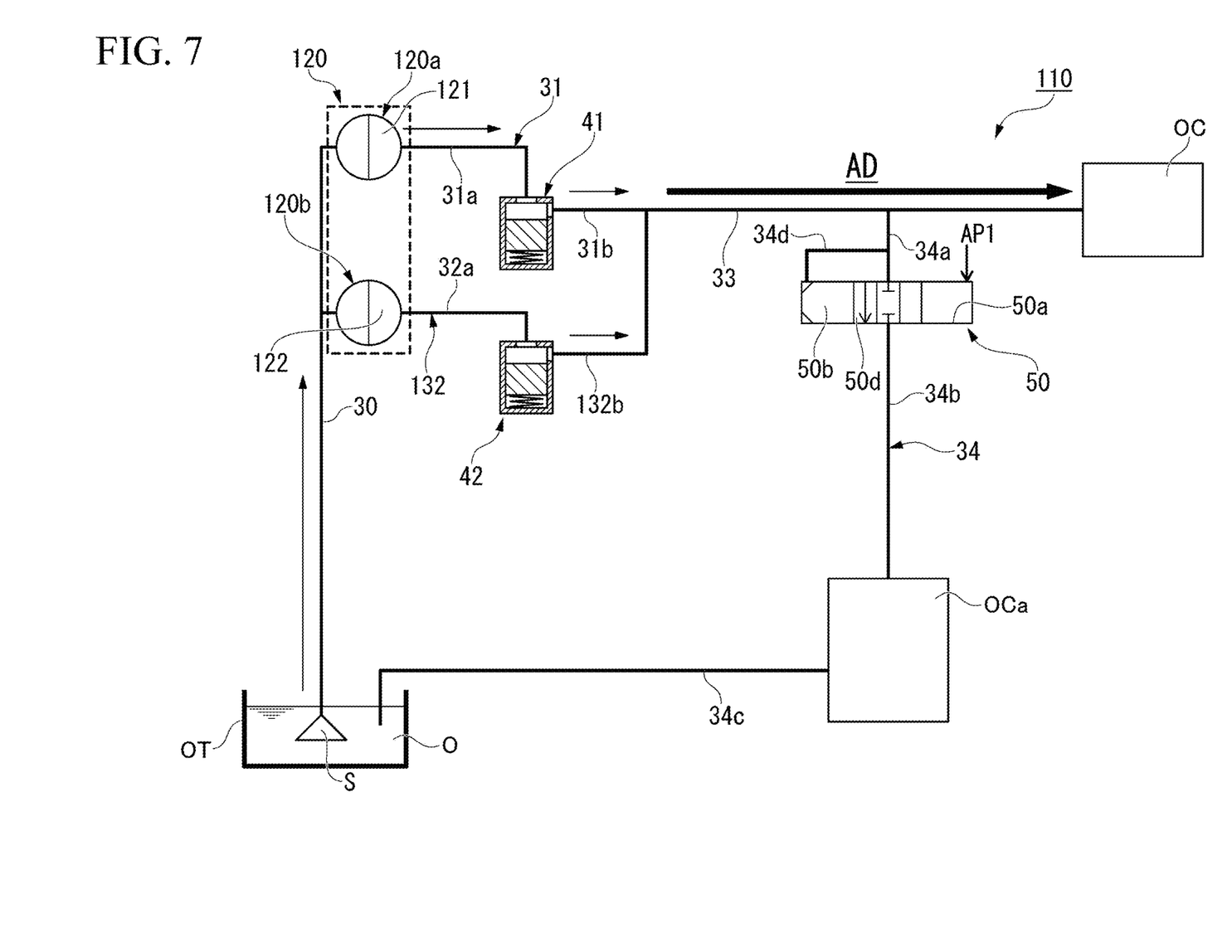
FIG. 7 is a diagram schematically showing one actuated state of a hydraulic control apparatus of a second example embodiment of the present disclosure.

As shown in FIG. 7, an oil pump assembly 120 of a hydraulic control apparatus 110 of the present example embodiment includes a first oil pump 120a having a first discharge port 121, and a second oil pump 120b having a second discharge port 122. Unlike the first example embodiment, the hydraulic control apparatus 110 does not include the directional control valve 51 and the second connection oil passage 35. Thus, unlike the first example embodiment, the second oil passage 132 does not include the third portion 32c. A second portion 132b joins the second check valve 42 and the output-side oil passage 33. In FIG. 7, a case where the hydraulic control apparatus 110 is in a full discharged state AD is shown.

According to the present example embodiment, the first discharge port 121 and the second discharge port 122 are provided on different oil pumps, respectively. For this reason, if both the first oil pump 120a and the second oil pump 120b are actuated, the hydraulic control apparatus 110 is in the full discharged state AD. If only one of the first oil pump 120a and the second oil pump 120b is actuated, the hydraulic control apparatus 110 is in a half discharged state HD. Thus, without providing the directional control valve 51, the half discharged state HD and the full discharged state AD can be switched.

The present disclosure is not limited to the aforementioned example embodiments, and can adopt other constitutions. A predetermined direction in which the spool hole in the pressure regulating check valve extends is not particularly limited, and may be a direction other than the vertical direction. The first elastic portion may be disposed inside the second elastic portion. The elastic modulus of the first elastic portion and the elastic modulus of the second elastic portion may be identical to each other. The first elastic portion and the second elastic portion may be arranged in a direction orthogonal to the predetermined direction. The winding direction of the first elastic portion and the winding direction of the second elastic portion may be the same direction. The valve may not have the tubular portion. If the valve can open/close the inflow hole, the valve may not open/close the outflow hole.

In the aforementioned example embodiments, only the second check valve 42 is configured as the pressure regulating check valve, but the present disclosure is not limited thereto. For example, the first check valve 41 may also be the pressure regulating check valve having the same structure as the second check valve 42. The first check valve may not be provided. The directional control valve may be provided on the first oil passage instead of the second oil passage. In this case, the second connection oil passage is joined to the first oil passage via the directional control valve. The directional control valve provided on the first oil passage switches between the state in which the oil O discharged from the first discharge port to the first oil passage flows to the output-side oil passage and the state in which the oil O discharged from the first discharge port to the first oil passage flows to the second connection oil passage. In this case, in the half discharged state HD, only the oil O from the second oil passage flows into the output-side oil passage.

The first connection oil passage may join the output-side oil passage and the input-side oil passage. In this case, the pressure regulating valve allows a flow of the oil O from the output-side oil passage to the input-side oil passage in the first connection oil passage in the open state, and obstructs a flow of the oil O from the output-side oil passage to the input-side oil passage in the first connection oil passage in the closed state. The first connection oil passage and the pressure regulating valve may not be provided. The second connection oil passage may join the directional control valve and the oil tank. The oil pump having the oil pump assembly may be a mechanical pump driven without using an engine or an electric oil pump.

Further, the hydraulic control apparatus in the example embodiments is not particularly limited to its use, and may be mounted except for the vehicle. Further, the components described herein can be appropriately combined within a range consistent with each other.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A hydraulic control apparatus to control a control target using a hydraulic pressure, the hydraulic control apparatus comprising:
    an oil pump assembly including a first discharge port and a second discharge port;
    an input-side oil passage through which oil suctioned from an oil tank to the oil pump assembly passes;
    a first oil passage into which the oil discharged from the first discharge port flows;
    a second oil passage into which the oil discharged from the second discharge port flows;
    an output-side oil passage into which the oil from the first oil passage and the oil from the second oil passage flow to supply the hydraulic pressure to the control target; and
    a pressure regulating check valve provided on the second oil passage to check a flow of the oil from the output-side oil passage to the second discharge port, and to regulate the hydraulic pressure in the second oil passage; wherein
    the pressure regulating check valve includes:
    a housing including a spool hole that extends in a predetermined direction and includes a bottom on a first side thereof in the predetermined direction, an inflow hole that is located on a second side of the spool hole that is opposite to the first side in the predetermined direction and is joined with an interior of the spool hole, and an outflow hole that is provided on an inner circumferential surface of the spool hole and is joined with the interior of the spool hole;
    a valve that is housed in the interior of the spool hole to be movable in the predetermined direction and includes a valve body that can open/close the inflow hole;
    a first elastic portion that is housed in the interior of the spool hole between the valve body and the bottom in the predetermined direction, extends in the predetermined direction, to apply an elastic force toward the second side in the predetermined direction to the valve body; and
    a second elastic portion that is housed in the interior of the spool hole between the valve body and the bottom in the predetermined direction and extends in the predetermined direction;
    a natural length of the second elastic portion in the predetermined direction is shorter than a natural length of the first elastic portion in the predetermined direction, and is shorter than a distance between the valve body and the bottom in the predetermined direction when the valve body closes the inflow hole;
    the natural length of the second elastic portion in the predetermined direction is shorter than a distance between the bottom and the outflow hole in the predetermined direction; and
    the second elastic portion is structured to apply an elastic force toward the second side in the predetermined direction to the valve body in a state in which the valve body has opened the inflow hole.

2. The hydraulic control apparatus according to claim 1, wherein
    the first elastic portion and the second elastic portion are coil springs; and
    one of the first elastic portion and the second elastic portion is located inside the other of the first elastic portion and the second elastic portion.

3. The hydraulic control apparatus according to claim 2, wherein
    the valve includes a tubular portion that extends from the valve body to the first side thereof in the predetermined direction;
    a distance in the predetermined direction between the first side end of the valve body in the predetermined direction and the first side end of the tubular portion in the predetermined direction is shorter than the natural length of the second elastic portion in the predetermined direction;
    the second side end of the first elastic portion in the predetermined direction is housed in an interior of the tubular portion;
    an outer diameter of the second elastic portion is smaller than an inner diameter of the first elastic portion; and
    the second elastic portion is located inside the first elastic portion.

4. The hydraulic control apparatus according to claim 2, wherein a winding direction of the first elastic portion and a winding direction of the second elastic portion are opposite to each other.

5. The hydraulic control apparatus according to claim 1, wherein an elastic modulus of the second elastic portion is larger than that of the first elastic portion.

6. The hydraulic control apparatus according to claim 1, further comprising:
    a first connection oil passage to join the output-side oil passage and the oil tank or the input-side oil passage; and a pressure regulating valve provided on the first connection oil passage; wherein in a case where a value of a hydraulic pressure in the output-side oil passage at a portion to which the first connection oil passage is connected is greater than or equal to a prescribed value, the pressure regulating valve is brought into an open state in which a flow of the oil from the output-side oil passage to the oil tank or the input-side oil passage in the first connection oil passage is allowed; and in a case where the value of the hydraulic pressure is smaller than the prescribed value, the pressure regulating valve is brought into a closed state in which the flow of the oil from the output-side oil passage to the oil tank or the input-side oil passage in the first connection oil passage is obstructed.

7. The hydraulic control apparatus according to claim 1, further comprising a check valve provided on the first oil passage to check a flow of the oil from the output-side oil passage to the first discharge port.

8. The hydraulic control apparatus according to claim 1, wherein the oil pump assembly includes an oil pump that includes both the first discharge port and the second discharge port.

9. The hydraulic control apparatus according to claim 1, wherein the oil pump assembly includes:
a first oil pump that includes the first discharge port; and
a second oil pump that includes the second discharge port.

10. A hydraulic control apparatus to control a control target using a hydraulic pressure the hydraulic control apparatus comprising:
an oil pump assembly including a first discharge port and a second discharge port;
an input-side oil passage through which oil suctioned from an oil tank to the oil pump assembly passes:
a first oil passage into which the oil discharged from the first discharged port flows:
a second oil passage into which the oil discharged from the second discharge port flows;
an output-side oil passage into which the oil from the first oil passage and the oil from the second oil passage flow to supply the hydraulic pressure to the control target; and
a pressure regulating check value provided on the second oil passage to check a flow of the oil from the output-oil passage to the second discharge port, and to regulate the hydraulic pressure in the second oil passage;
a directional control valve provided at a portion of the second oil passage between the pressure regulating check valve and the output-side oil passage; and
a second connection oil passage to join the directional control valve and the oil tank or the input-side oil passage; wherein
the pressure regulating check valve includes:
a housing including a spool hole that extends in a predetermined direction and includes a bottom on a first side thereof in the predetermined direction, an inflow hole that is located on a second side of the spool hole that is opposite to the first side in the predetermined direction and joined with an interior of the spool hole, and an outflow hole that is provided on an inner circumferential surface of the spool hole and is joined with the interior of the spool hole;
a valve that is housed in the interior of the spool hole to be movable in the predetermined direction and includes a valve body that can open/close the inflow hole;

a first elastic portion that is housed in the interior of the spool hole between the valve body and the bottom in the predetermined direction, extends in the predetermined direction, to apply an elastic force toward the second side in the predetermined direction to the valve body; and
a second elastic portion that is housed in the interior of the spool hole between the valve body and the bottom in the predetermined direction and extends in the predetermined direction;
a natural length of the second elastic portion in the predetermined direction is shorter than a natural iength of the first elastic portion in the predetermined direction, and is shorter than a distance between the valve body and the bottom in the predetermined direction when the valve hod closes the inflow hole;
the second elastic portion is structured to apply an elastic force toward the second side in the predetermined direction to the valve body in a state in which the valve body has opened the inflow hole; and
the directional control valve is operative to switch between a state in which the oil discharged from the second discharge port to the second oil passage flows to the output-side oil passage and a state in which the oil discharged from the second discharge port to the second oil passage flows to the second connection oil passage.

11. A hydraulic control apparatus to control a control target using a hydraulic pressure, the hydraulic control apparatus, comprising:
an oil pump assembly including a first discharge port and a second discharge port;
an input-side oil passage through which oil suctioned from an oil tank to the oil pump assembly passes;
a first oil passage into which the oil discharged from the first discharge port flows;
a second oil passage into which the oil discharged from the second discharge port flows;
an output-side oil passage into which the oil from the first oil passage and the oil from the second oil passage flow to supply the hydraulic pressure to the control target; and
a pressure regulated check valve provided on the second oil passage to check a flow of the oil from the output-side oil passage to the second discharge port, and to regulate the hydraulic pressure in the second oil passage;
a directional control valve connected to the first oil passage; and
a second connection oil passage to join the directional control valve and the oil tank or the input-side oil passage; wherein
the pressure regulating check valve includes;
a housing including a spool hole that extends in a predetermined direction and includes a bottom on a first side thereof in the redetermined direction, an inflow hole that is located on a second side of the spool hole that is opposite to the first side in the predetermined direction and is joined with an interior of the spool hole, and an outflow hole that is provided on an inner circumferential surface of the spool hole and is joined with the interior of the spool hole;
a valve that is housed in the interior of the spool hole to be movable in the predetermined direction and includes a valve body that can open/close the inflow hole;

a first elastic portion that is housed in the interior of the spool hole between the valve body and the bottom in the predetermined direction, extends in the predetermined direction, to apply an elastic force toward the second side in the predetermined direction to the valve body and a second elastic portion that is housed in the interior of the spool hole between the valve body and the bottom in the predetermined direction and extends in the predetermined direction;

a natural lenqh of the second elastic portion in the predetermined direction is shorter than a natural length of the first elastic portion in the predetermined direction, and is shorter than a distance between the valve body and the bottom in the predetermined direction when the valve body doses the inflow hole;

the second elastic portion is structured to apply an elastic force toward the second side in the predetermined direction to the valve body in a state in which the valve body has opened the inflow hole; and the directional control valve is operative to switch between a state in which the oil discharged from the first discharge port to the first oil passage flows to the output-side oil passage and a state in which the oil discharged from the first discharge port to the first oil passage flows to the second connection oil passage.

\* \* \* \* \*